(12) United States Patent
Coleman, Jr.

(10) Patent No.: US 6,760,941 B2
(45) Date of Patent: Jul. 13, 2004

(54) ACCESSORY ATTACHMENT FOR MAGNETIC RETRIEVAL TOOL

(76) Inventor: Edward S. Coleman, Jr., 116 Keeler Dr., Ridgefield, CT (US) 06877

(*) Notice: Subject to any disclaimer, the term of this patent is extended or adjusted under 35 U.S.C. 154(b) by 0 days.

(21) Appl. No.: 10/139,921

(22) Filed: May 6, 2002

(65) Prior Publication Data

US 2003/0204915 A1 Nov. 6, 2003

(51) Int. Cl.[7] ................................................. B25F 1/00
(52) U.S. Cl. ............................. 7/170; 7/901; 294/65.5; 403/56; 403/76
(58) Field of Search .................... 7/170, 901; 294/19.1, 294/65.5; D8/107, 105, 14; 403/122, 56, 57, 68, 70–74, 76, 78, DIG. 1

(56) References Cited

U.S. PATENT DOCUMENTS

| 4,461,284 A | * | 7/1984 | Fackler ........................ 403/56 |
| 5,782,149 A | * | 7/1998 | Jensen ........................ 294/65.5 |
| D404,632 S | | 1/1999 | Reynolds et al. |
| 6,048,073 A | * | 4/2000 | Shiao ........................ 294/65.5 |
| 6,193,386 B1 | | 2/2001 | Reynolds |
| D446,701 S | | 8/2001 | Coleman, Jr. et al. |

* cited by examiner

Primary Examiner—D. S. Meislin
(74) Attorney, Agent, or Firm—Bachman & LaPointe, P.C.

(57) ABSTRACT

An accessory attachment device for a magnetic retrieval tool includes a ferrous base member having a substantially flat surface for magnetically securing to a magnetic tool and an accessory attachment member extending from the surface; and an accessory member connected to the attachment member.

9 Claims, 1 Drawing Sheet

ACCESSORY ATTACHMENT FOR MAGNETIC RETRIEVAL TOOL

BACKGROUND OF THE INVENTION

The invention relates to magnetic retrieval tools and, more particularly, to an accessory attachment which allows conversion of the retrieval tool into other tools such as inspection mirrors, magnifying glasses and the like.

Magnetic retrieval or pickup tools, inspection mirrors, magnifiers and the like are some of various hand tools which are useful, for example to mechanics, technicians, security personnel and the like. These tools are typically sold individually, and in tool kits, wherein each tool is a separate, stand-alone tool, with an integral handle. Of course, limited space is available in toolboxes, kits the like, and it is therefore desirable to provide tools which occupy a minimum amount of space.

It is therefore the primary object of the present invention to provide a tool assembly which allows for multiple tool functions while occupying a reduced amount of space.

It is a further object of the present invention to provide such a tool assembly wherein switching between different types of tools is simple to accomplish.

Other objects and advantages of the present invention will appear hereinbelow.

SUMMARY OF THE INVENTION

In accordance with the present invention, the foregoing objects and advantages have been readily attained.

According to the invention, an accessory attachment for a magnetic retrieval tool is provided, which device comprises a ferrous base member having a substantially flat surface for magnetically securing to a magnetic tool and an accessory attachment member extending from said surface; and an accessory member connected to said attachment member.

Still further according to the invention, a magnetic retrieval tool is provided which comprises a handle; a magnetic head attached to said handle and having a pickup surface; and an accessory attachment member comprising a ferrous base member having a substantially flat surface for magnetically securing to said pickup surface, an accessory attachment member extending from said surface and an accessory member connected to said attachment member.

BRIEF DESCRIPTION OF THE DRAWINGS

A detailed description of preferred embodiments of the present invention follows, with reference to the attached drawings, wherein.

DETAILED DESCRIPTION

The invention relates to magnetic retrieval tools and, more particularly, to an accessory attachment device for use with a magnetic retrieval tool so that the magnetic retrieval tool can be adapted to other functions, for example as an inspection mirror, magnifying glass, different type of magnet, and the like.

Figure 1:
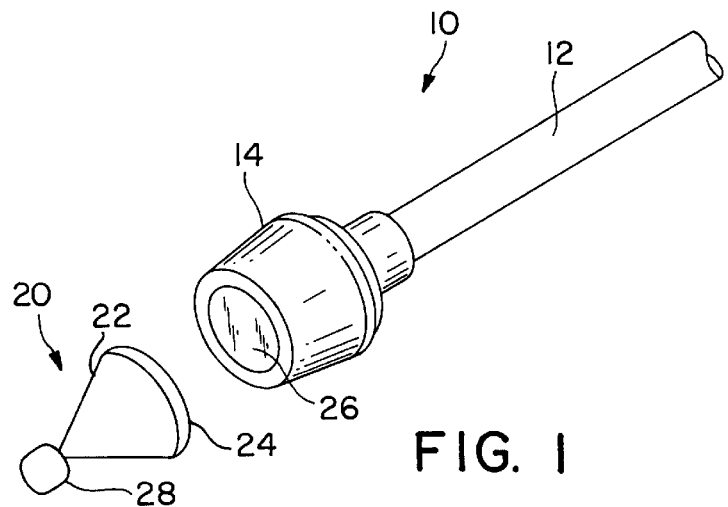
FIG. 1 is a perspective view of a magnetic retrieval tool and an accessory attachment device for same.

FIG. 1 shows a perspective view of a typical magnetic retrieval tool 10 having a handle 12 and a magnetic head 14 attached to handle 12 and adapted for use in retrieving ferrous or magnetically attracted objects. As also shown in FIG. 2, tool 10 may have magnetic head 14 in the form of a magnet 16 secured within a holder 18 which is secured to handle 12.

In accordance with the present invention, an accessory attachment device 20 is provided in the form of a ferrous base member 22 having a substantially flat surface 24 for magnetically securing to retrieval tool 10, for example to pickup surface 26 of magnetic head 14.

Base member 22 further includes an accessory attachment member 28 which may preferably be in the form of a rounded member or spherical member extending away from surface 24, and an accessory member 30 (see FIG. 2) is advantageously secured to accessory attachment member 28.

Figure 2:
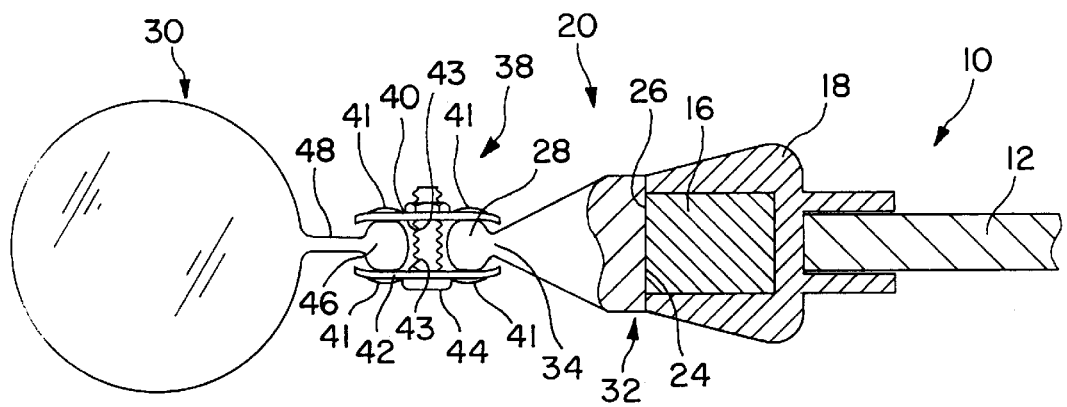
FIG. 2 is a partially sectioned side view of a magnetic retrieval tool with an accessory attachment device magnetically secured thereto.

Still referring to FIGS. 1 and 2, accessory member 30 may suitably be an inspection mirror as shown in FIG. 2, or a magnifying glass, or any other tool or tool head which is readily adapted for use on a hand-held handle. Other examples of useful tool accessories include, but are not limited to, magnets of different strength, laser pointers, writing implements and the like. In accordance with the most preferred embodiment of the present invention, inspection mirrors and magnifying glasses are the most commonly used accessories in tool kits along with magnetic retrieval heads, and thus, this configuration of accessories is a preferred embodiment of the present invention.

Figure 3:
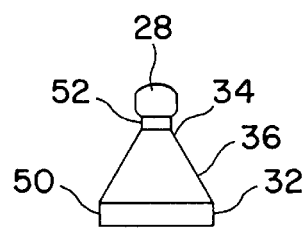
FIG. 3 is a side view of the accessory attachment device in accordance with the present invention.
Figure 4:
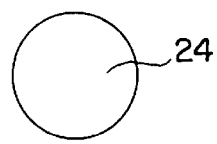
FIG. 4 is a bottom view of the accessory attachment device of the present invention.

Referring also to FIGS. 3 and 4, accessory attachment device 20 is advantageously provided in the form of a generally conical-shaped member having a base 32 and a point 34, with a conical or frusto-conical surface 36 disposed therebetween. Base 32 has a substantially flat bottom which defines surface 24 for magnetic securement or attachment to magnetic head 14.

Surface 24 and pickup surface 26 of magnetic head 14 are preferably provided having substantially the same peripheral contour. As shown in FIG. 1, in this embodiment, pickup surface 26 and surface 24 are both substantially circular, and have substantially the same diameter. This leads to a tool having a clean appearance which the accessory member is attached thereto.

Rounded member 28 is advantageously adapted to allow pivotably connection of accessory 30 thereto. This is particularly desirable in conjunction with several of the expected types of accessories, especially inspection mirrors and magnifying glasses, where such accessories are set to particular angles during use. A pivotable connection 38 (FIG. 2) is advantageously positioned between accessory attachment device 20 and accessory 30, and may preferably be provided in the form of two spaced plates 40, 42, which are secured in a spaced position by an attachment member such as a threaded screw and nut assembly 44, with rounded member 28 pivotably secured between plates 40, 42 at one end.

Also as shown in FIG. 2, accessory members 30 may advantageously be provided with an extension arm 48 having a rounded member 46 positioned thereon for pivotable mounting between plates 40, 42 as shown. This type of securement allows pivotable attachment of both accessory attachment 20 and accessory 30 to opposite ends of connection member 38, which allows for a large degree of mobility of accessory 30 relative to accessory attachment device 20 as desired. Of course, other mechanisms can be used for connecting, and preferably pivotably connecting, accessories 32 to accessory attachment device 20, well within the broad scope of the present invention.

Still referring to FIG. 2, plates 40, 42, are preferably provided with indentations 41 on inner surfaces 43 which pivotably receive members 28, 46 so as to provide secure pivotable connection as desired.

Accessory attachment device 20 may advantageously be provided from any suitable ferrous or magnetically attracted material. One preferred example of suitable material is CRS steel, although numerous other alternatives are available and would be readily apparent to a person of ordinary skill in the art. CRS steel is preferred, however, since this material is particularly well suited to machining the accessory attachment device 20 into the desired form, and responds well to securement to magnets as desired.

In further accordance with the present invention, accessory attachment device 20 is preferably providing having base 32, point 34 and conical surface 36 disposed therebetween. Conical surface 36 is preferably positioned at an angle to the vertical, or the straight edge 50 of base 32, of about 45°. Further, in order to provide sufficient clearance for pivot of connecting member 38 relative to rounded head 28, rounded head 28 may be positioned on a short neck or extension 52 extending from point 34 as best shown in FIG. 3.

As set forth above, a large number of potentially desirable accessories can be provided and secured to a magnetic head 14 using accessory attachment device 20 in accordance with the present invention. Specific examples include inspection mirrors and magnifying glasses. An inspection mirror is illustrated in FIG. 2. Magnifying glasses are readily known to a person of ordinary skill in the art and would have similar appearance to that in FIG. 2. A magnifying glass is therefore not specifically illustrated as repetitive.

It should readily be appreciated that the accessory attachment device in accordance with the present invention advantageously allows for a magnetic retrieval tool such as that illustrated in FIG. 1 to be adapted to perform other functions as well, for example the functions of inspection mirrors and magnifying glasses, without the need for providing complete additional tools. This provides the desired functionality to an end user, without taking up the space normally occupied by each individual complete tool, for example in a toolbox or tool kit.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed:

1. A magnetic retrieval tool, comprising:
   a handle;
   a magnetic head attached to said handle and having an outer peripheral edge defining a substantially flat pickup surface; and
   an accessory attachment device comprising a ferrous base member having a proximal outer peripheral edge defining a substantially flat surface for magnetically securing to said pickup surface, an accessory attachment member extending from said base and an accessory member connected to said attachment member.

2. The tool of claim 1, wherein said pickup surface of said magnetic head and said flat surface of said base member have substantially the same peripheral contour.

3. The tool of claim 1, wherein said base member has a generally conical shape having a base and a point, and wherein said surface is said base, and said attachment member extends from said point.

4. The tool of claim 1, wherein said attachment member comprises a rounded head adapted to pivotably receive said accessory member.

5. The tool of claim 4, wherein said attachment member further includes a link member mounted between said rounded head and said accessory.

6. The tool of claim 5, wherein said link member has a first end pivatably attached to said rounded head and a second end pivotably attached to said accessory.

7. The tool of claim 5, wherein said link member comprises first and second spaced plates having opposed inner surfaces adapted to receive said rounded head therebetween, and a fastening member for securing said spaced plates with said rounded head positioned therebetween.

8. The tool of claim 7, wherein said accessory has a rounded member, and said rounded member is pivotably positioned between said spaced plates.

9. The tool of claim 1, wherein said accessory member is selected from the group consisting of inspection mirrors and magnifying glasses.

* * * * *